(12) United States Patent
Hoelsaeter

(10) Patent No.: US 7,433,150 B2
(45) Date of Patent: Oct. 7, 2008

(54) DATA CARTRIDGE MAGAZINE AND METHOD OF OPERATION THEREOF

(75) Inventor: Håvard Hoelsaeter, Oslo (NO)

(73) Assignee: Tandberg Data ASA, Oslo (NO)

( * ) Notice: Subject to any disclaimer, the term of this patent is extended or adjusted under 35 U.S.C. 154(b) by 570 days.

(21) Appl. No.: 10/973,535

(22) Filed: Oct. 26, 2004

(65) Prior Publication Data

US 2005/0105209 A1 May 19, 2005

Related U.S. Application Data

(60) Provisional application No. 60/516,542, filed on Oct. 31, 2003.

(51) Int. Cl.
*G11B 15/68* (2006.01)

(52) U.S. Cl. .................................................. 360/92.1

(58) Field of Classification Search .................. 360/92, 360/92.1; 369/30.48
See application file for complete search history.

(56) References Cited

U.S. PATENT DOCUMENTS

| | | | |
|---|---|---|---|
| 3,969,007 A | 7/1976 | Lowry | |
| 4,802,035 A | 1/1989 | Ohtsuka | |
| 4,812,629 A | 3/1989 | O'Neil et al. | |
| 4,910,619 A | 3/1990 | Suzuki et al. | |
| 5,285,335 A | 2/1994 | Sato | |
| 5,303,214 A | 4/1994 | Kulakowski et al. | |
| 5,508,859 A | 4/1996 | Hu et al. | |
| 5,781,368 A * | 7/1998 | Kotaki et al. | .................. 360/92 |
| 6,005,744 A | 12/1999 | Terashima | |
| 6,014,353 A | 1/2000 | Kong et al. | |
| 6,019,230 A | 2/2000 | Hayashi | |
| 6,034,928 A | 3/2000 | Inoue | |
| 6,095,445 A | 8/2000 | Hentrich | |
| 6,115,331 A | 9/2000 | Inoue et al. | |
| 6,134,212 A | 10/2000 | Pines et al. | |
| 6,271,982 B1 | 8/2001 | Helmick | |
| 6,396,658 B1 | 5/2002 | Iwabuchi | |
| 6,424,603 B1 | 7/2002 | Matsushima | |
| 6,580,582 B1 | 6/2003 | Caverly | |
| 6,621,655 B2 * | 9/2003 | White et al. | .................. 360/92 |
| 6,639,751 B2 | 10/2003 | Brace et al. | |

(Continued)

FOREIGN PATENT DOCUMENTS

DE 198 49 885 C1 3/2000

(Continued)

*Primary Examiner*—Tianjie Chen
(74) *Attorney, Agent, or Firm*—Schiff Hardin LLP

(57) ABSTRACT

A data storage and retrieval device utilizes a data cartridge recording and playback apparatus and has storage magazines for holding a plurality of data cartridges for use by the recording and playback apparatus. The storage magazines have slots for storing the data cartridges and retaining the data cartridges in place when not being accessed using a cartridge latch. A spring moves the cartridge to an eject position upon release of the cartridge latch. Similarly, the storage magazines have a latch to secure the magazine in place and to selectively release the magazine when desired. The spring loaded ejection apparatus for the magazines is damped to provide slowed movement during the ejection of the magazine. Further, a catch secures the magazine in a partially ejected position to permit exchange of one or a limited number of the cartridges without complete removal of the magazine from the device, and preferably without halting the operation of the device.

23 Claims, 9 Drawing Sheets

U.S. PATENT DOCUMENTS

| | | |
|---|---|---|
| 6,643,091 B2 | 11/2003 | Coffin et al. |
| 6,643,226 B1 * | 11/2003 | Thayer et al. ............ 369/30.48 |
| 6,693,758 B2 | 2/2004 | Patterson et al. |
| 7,057,847 B2 * | 6/2006 | Reasoner et al. .............. 360/92 |
| 2003/0086202 A1 | 5/2003 | Hoelsaeter |

FOREIGN PATENT DOCUMENTS

| | | |
|---|---|---|
| EP | 0 240 926 | 10/1987 |
| EP | 0 240 926 A2 | 10/1987 |
| EP | 0 519 655 | 12/1992 |
| EP | 0 519 655 A2 | 12/1992 |
| EP | 0 712 126 | 11/1995 |
| EP | 0 712 126 A2 | 5/1996 |
| EP | 09183479 | 7/1997 |
| EP | 11273200 | 10/1999 |
| EP | 1 291 860 A2 | 8/2002 |
| JP | 09 183479 A | 7/1997 |
| JP | 11 273200 A | 10/1999 |
| WO | WO 00/41174 | 7/2000 |

* cited by examiner

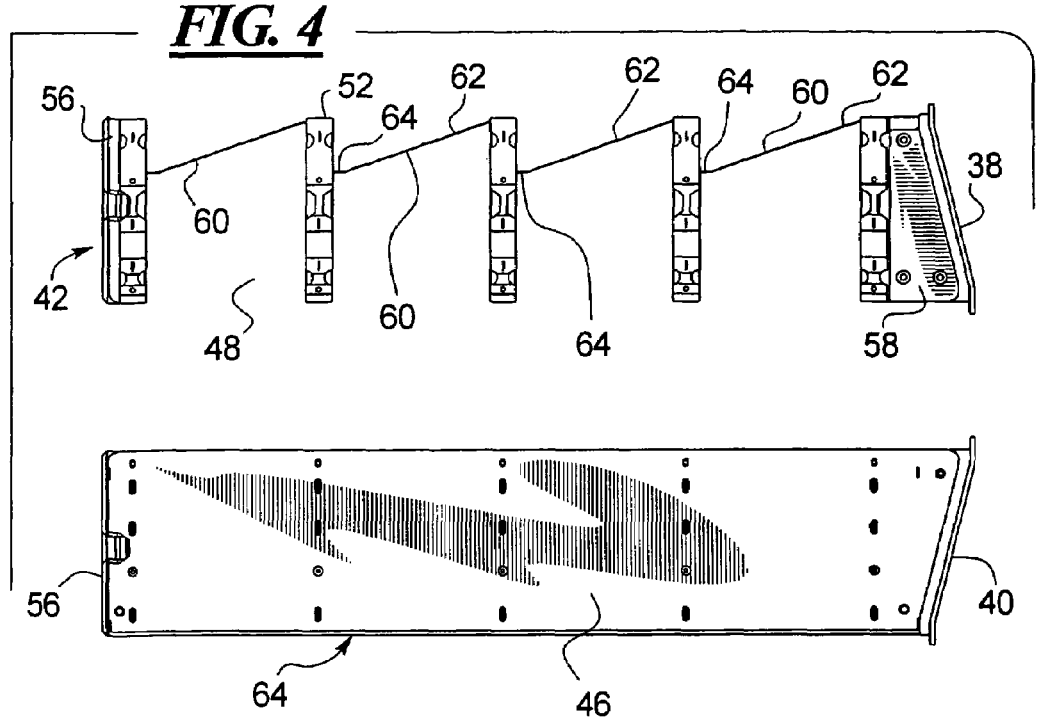
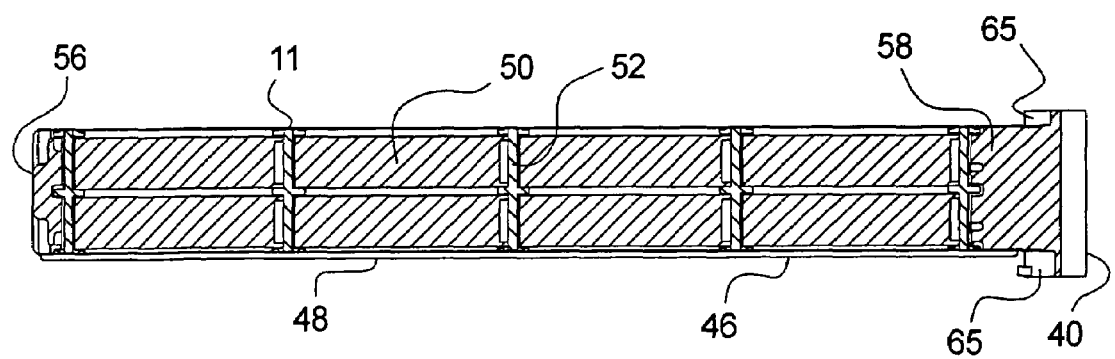

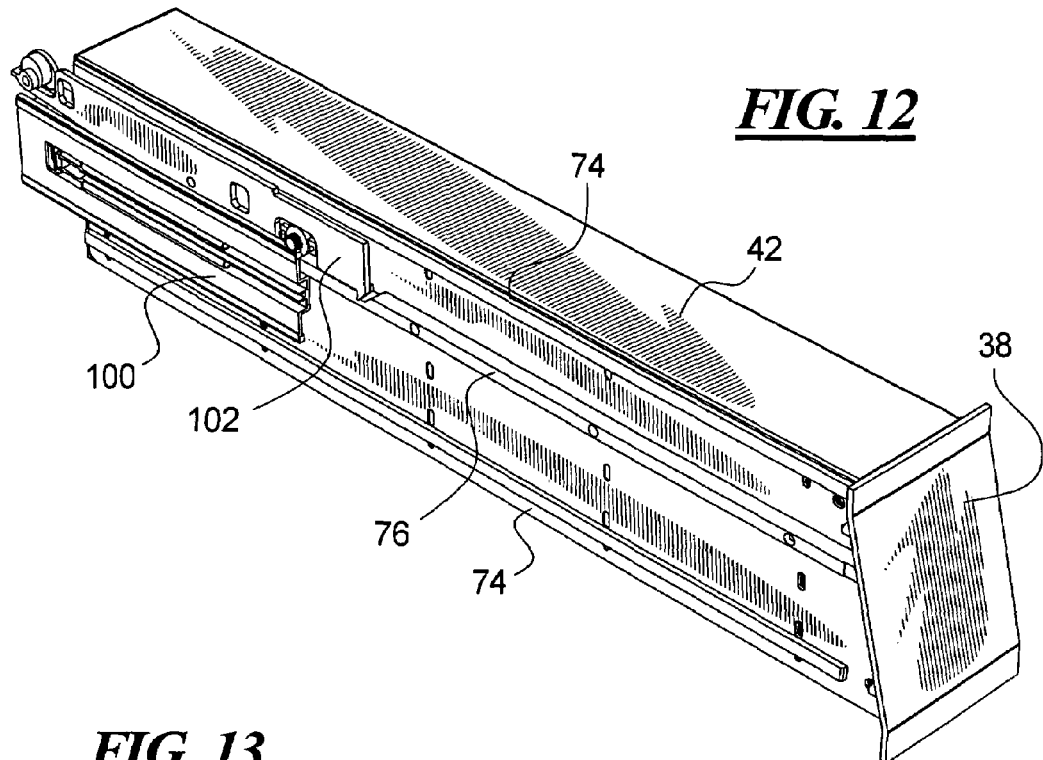
FIG. 12
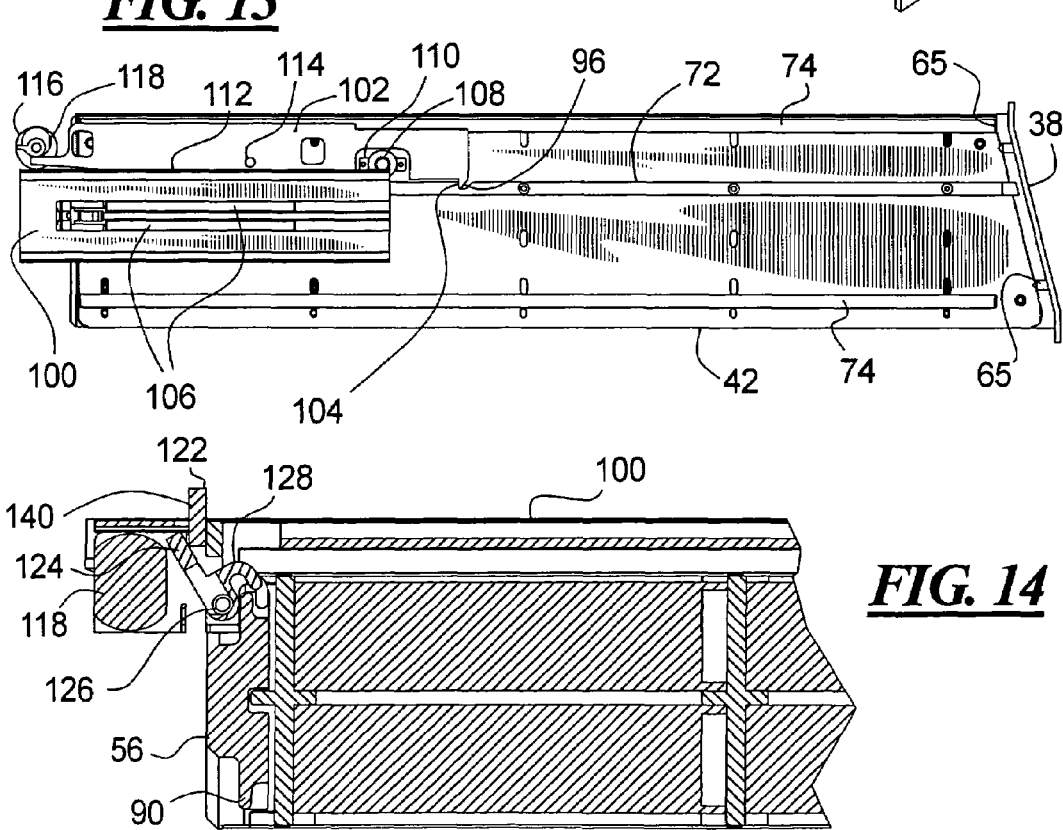
FIG. 13
FIG. 14

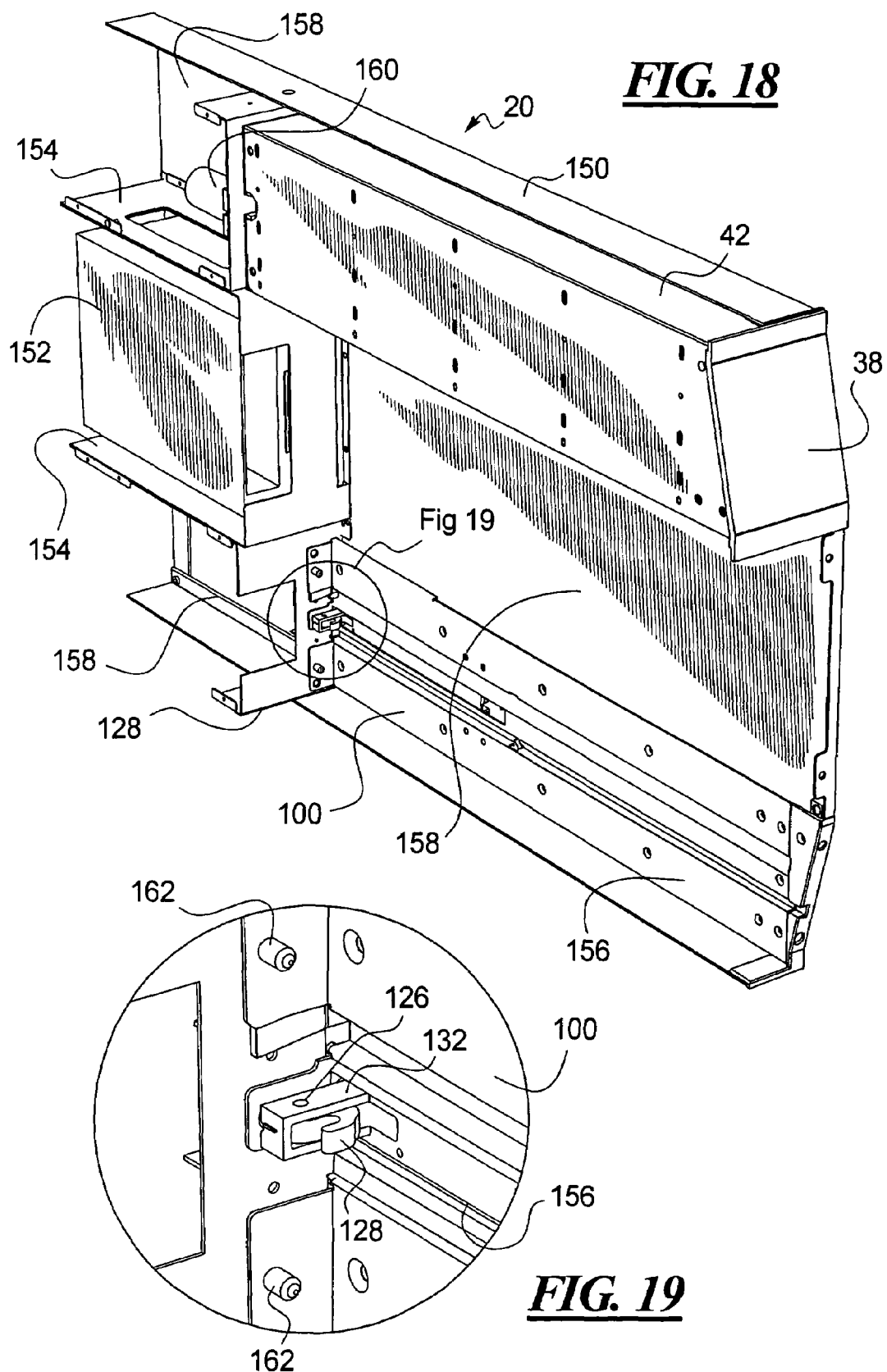

ated loading and unloading and storage of the data
DATA CARTRIDGE MAGAZINE AND METHOD OF OPERATION THEREOF

CROSS REFERENCE TO RELATED APPLICATION

This application claims the benefit of U.S. Provisional Patent Application Ser. No. 60/516,542, filed Oct. 31, 2003, which is incorporated herein by reference.

BACKGROUND OF THE INVENTION

1. Field of the Invention

The present invention relates generally to an apparatus and method for storage, retrieval and loading/unloading of units of a data storage medium, and particularly to a method and apparatus for storage, retrieval and loading/unloading of cartridges of a data storage medium, such as magnetic tape cartridges.

2. Description of the Related Art

Data storage, such as for data backup on computer systems and networks, requires large storage capacities. Many such data backup systems use cartridges, such as magnetic tape cartridges for the data storage medium. Such magnetic tape data cartridges must be loaded and unloaded from read/write devices, also referred to as tape drives. It is known to provided automated loading and unloading and storage of the data cartridges in data backup systems using robotic cartridge handling devices. Such automated loading and unloading systems can be complex and costly.

It is very important that data storage and data retrieval systems having cartridge loading/unloading devices provide a simple and low cost solution. The low cost must not be achieved while sacrificing ease of use or a user friendly operator interface.

SUMMARY OF THE INVENTION

The present invention provides a data storage and retrieval device using data cartridges that are stored in storage magazines. The storage magazines are selectively removable from the data storage and retrieval device by a user to permit exchange of the storage magazine with another storage magazine or to permit exchange of data cartridges in the storage magazine with other data cartridges. The present data storage and retrieval device utilizes a locking mechanism to engage and hold the storage magazine in position in the data storage and retrieval device and an eject spring to move the storage magazine to an eject position upon release of the locking mechanism. In a preferred embodiment, the data storage and retrieval device includes two storage magazines, and the magazines are configured to ensure that only the correct magazine may be inserted into a magazine insertion location in the device.

BRIEF DESCRIPTION OF THE DRAWINGS

FIG. 4 is a side view of the storage magazines of FIG. 3;

FIG. 5 is a longitudinal cross sectional view of the storage magazine of FIG. 4 along line C-C;

FIG. 12 is a perspective view of the storage magazine and a locking and eject mechanism to secure the magazine in the data storage and retrieval device;

FIG. 13 is an enlarged side view of the storage magazine and a locking and eject mechanism of FIG. 12;

FIG. 14 is a cross sectional view of the storage magazine and the locking and eject mechanism taken along line A-A of FIG. 13;

FIG. 18 is a perspective view of the data storage and retrieval device showing the cover removed and one storage magazine removed;

FIG. 19 is an enlarged detail view, in perspective, of the of the mechanism that prevents extraction of the storage magazine without engagement with the eject damping mechanism.

DETAILED DESCRIPTION OF THE PREFERRED EMBODIMENTS

The preferred embodiment of the present data storage and retrieval device is simple, low cost and user-friendly. The present data storage and retrieval device is connected to a computer system or computer network so as to receive and transmit data between the device and the computer or network. It may be used for data backup purposes, for data archiving or any number of data handling and data storage uses.

The data storage and retrieval device of the illustrated embodiment uses magnetic tape cartridges as the medium for data storage. The principles of the present invention are applicable to various other data storage mediums as well and so the present invention is not limited to a particular type, size or format of media. Likewise, the recording/reading device that receives the media cartridges may be of various types so as to be compatible with the media being utilized. In the illustrated device, a tape cartridge drive provides recording and playback capabilities.

As will be mentioned below, the exemplary data storage and retrieval device shown herein utilizes a robotic cartridge shuttle to move the data cartridges into and out of the tape cartridge drive. Examples of such cartridge shuttle mechanisms are shown in co-pending applications of the same assignee, such as in Provisional Patent Application Ser. No. 60/515,738, filed Oct. 30, 2003, and in the non-provisional application claiming benefit thereof. Such cartridge shuttle, or some other construction, are possible for use in the present device.

Operation of the data storage and retrieval device is generally under software control, usually through the computer system or network. The control may also be by firmware, including circuitry mounted within the housing of the present device. User operable switches and controls may also be provided on the body of the device for direct user control.

The present data storage and retrieval device is preferably rack mounted in a storage rack, or one of the storage racks, for a computer system or network. To facilitate ready mounting in the rack, the device is configured with a standard size. Although many different sizes are possible for the present device, the "U" form factor standards that are in common use for rack mounted computer devices are utilized in the example. All of the drawings of the present disclosure show a 2U form factor version of the data storage and retrieval device as an example. The present invention is also readily applicable to the 1U form factor and up to the 4U form factor.

Figure 1:
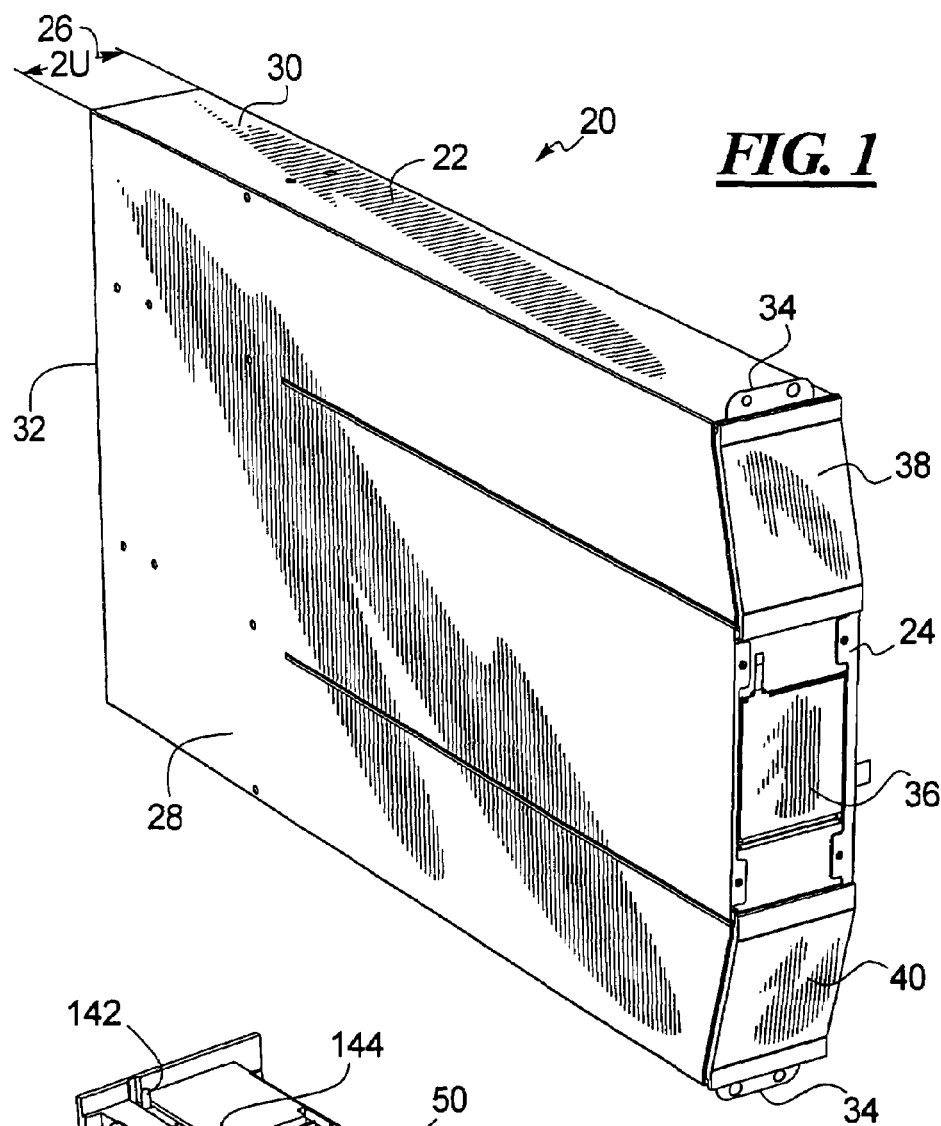
FIG. 1 is a perspective view of a data storage and retrieval device having two cartridge storage magazines with both magazines fully inserted into the device.
Figure 17:
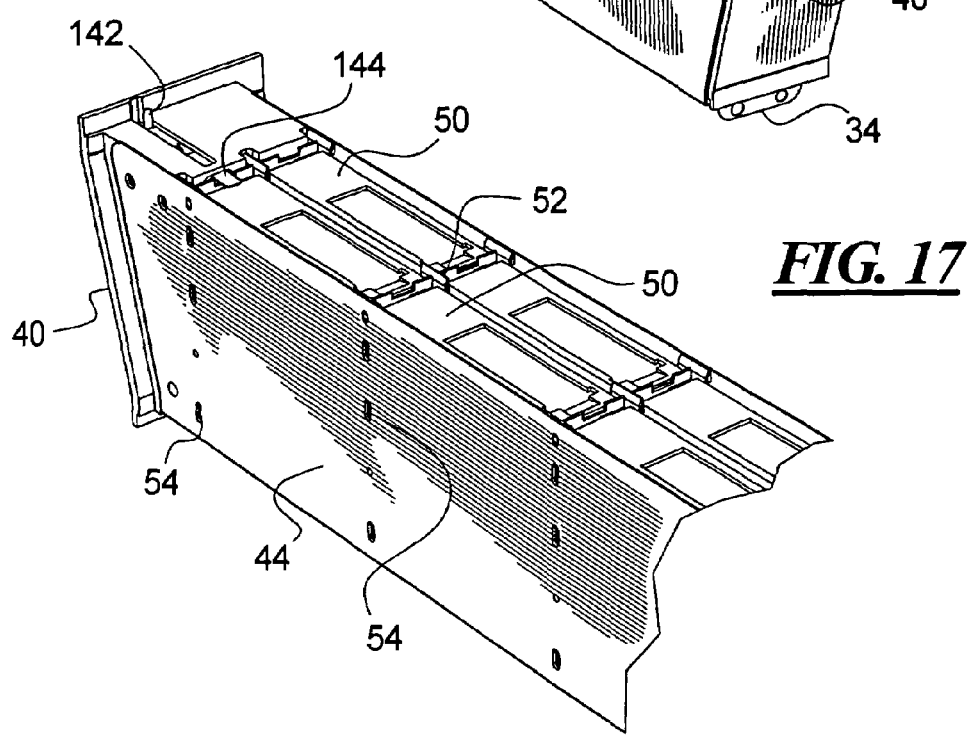
FIG. 17 is an enlarged partial perspective view of the storage magazine showing a slide bracket blocking cartridge extraction when the magazine is ejected to a mail-slot position.

Referring now to FIG. 1, a data storage and retrieval device 20 has a housing 22 and a front cover 24. The housing encloses a tape cartridge drive and cartridge shuttle apparatus as well as storage locations for tape cartridges. The housing 22 has a height corresponding to the 2U form factor, as indicated by the arrow 26, and has a top panel 28 and side panels 30. A rear panel 32 may be formed in one piece with the housing 22 or as a separate piece.

The front panel 24 has rack attachment lugs 34 on either side for mounting the data storage and retrieval device 20 in a computer rack. Other mounting means are also encompassed in the present invention. The front panel 24 also has a front control panel 36 that functions as a display and as a control interface, for example, with a touch screen, for operation of the present data storage and retrieval device. The control panel 36 may include control buttons and a display; details of which are not shown but which would be readily apparent to the person of ordinary skill in the art.

On the two opposite sides of the control panel 36 are front covers 38 and 40 of storage magazines for storing data cartridges. The two magazines of one embodiment are substantially identical except for the respective front covers 38 and 40. For example, all the parts in the magazine slide, lock and eject system are identical. This is important in the preferred embodiment in order to reduce the number of different parts and thereby the tooling investment and the cost of the product.

The front cover 24 of the data storage and retrieval device 20 or possibly the front covers 38 and 40 of the storage magazines might be of a snap-on type in order to customize the device. One embodiment has vent holes in the front covers 38 and 40 and a dust filter behind each cover. Two fans are located in the device at the rear end of the device create an under pressure or suction which draws in cooling air through the dust filters. The filters can easily be replaced when the magazines are in the mail-slot position, as will be described later. These features are not shown on the drawings for the sake of simplicity but their implementation is well known to those of skill in the art.

Figure 2:
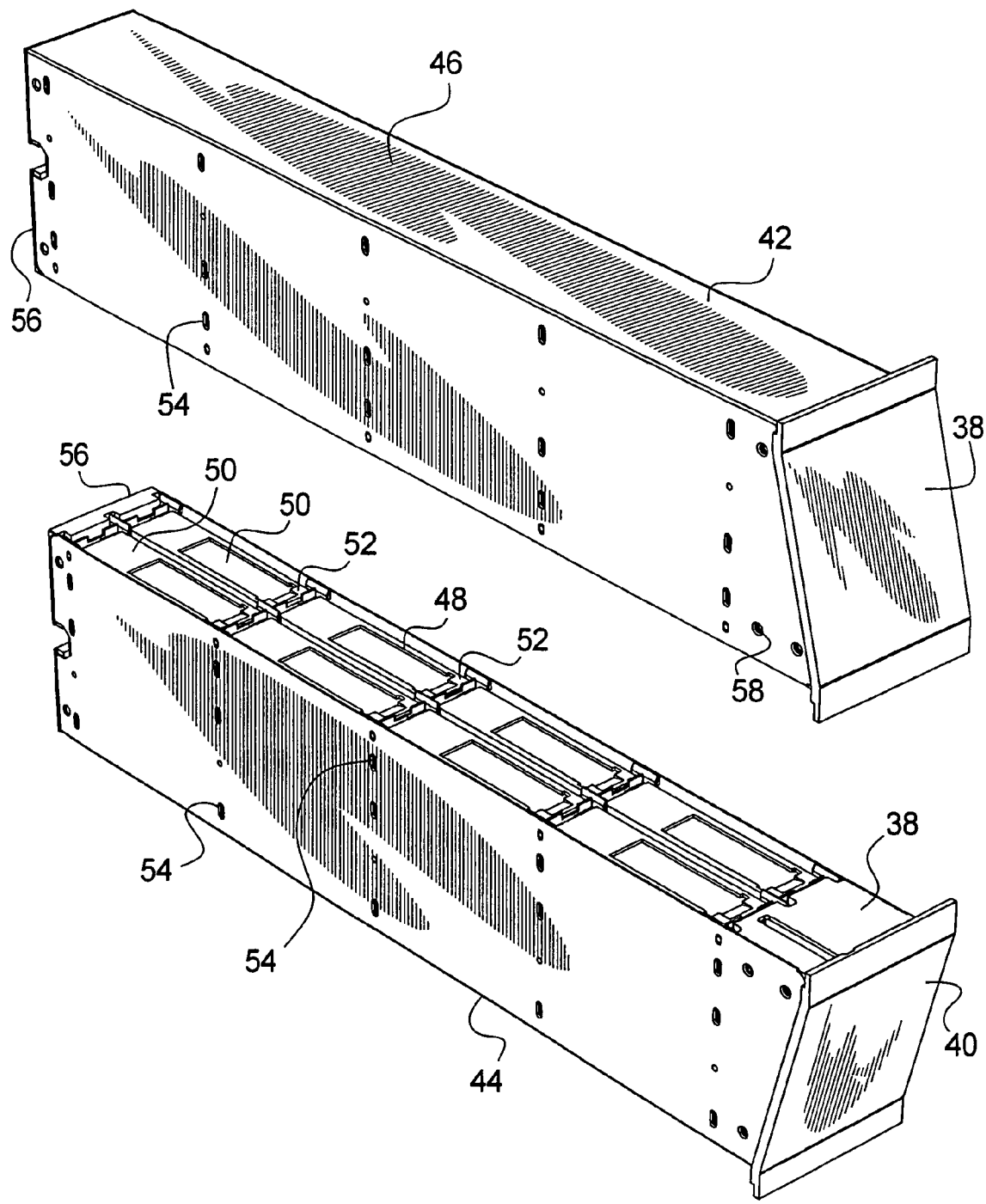
FIG. 2 is a perspective view of the two cartridge storage magazines removed from the data storage and retrieval device of FIG. 1 and including data cartridges stored in slots in the lower storage magazine.

FIG. 2 shows the front covers 38 and 40 on the storage magazines 42 and 44, where the storage magazines 42 and 44 have been removed from the data storage and retrieval device but remain in position as if they were mounted in the data storage and retrieval device. As is apparent from FIG. 2, the front covers 38 and 40 are angled relative to the length of the magazines.

Each magazine 42 and 44 has a magazine housing body 46 with a top wall, bottom wall and back wall. The housing body 46 is formed of sheet metal, for example. The front of each magazine has storage slots 48 of a size and shape to accommodate data cartridges 50. The illustrated storage magazines 42 and 44 have eight storage slots 48 each, so that the two storage magazines 42 and 44 together hold sixteen data cartridges 50. The slots 48 are separated from one another by dividers or partitions 52 that are connected to the housing 46 at connections 54. As will be described later, the partitions 52 include latches to hold the cartridges 50 in place in the slots 48. The back end of each of the storage magazines 42 and 44 is closed by an end cap 56 and the front end is closed by the front cover 38 and 40. A wedge shaped portion 58 is provided between the front most slot 48 and the front cover 38 and 40.

For the sake of simplicity much of the following description refers to one or the other of the magazines 42 and 44; however, the features found on one of the magazines are also found on the other magazine.

Figure 3:
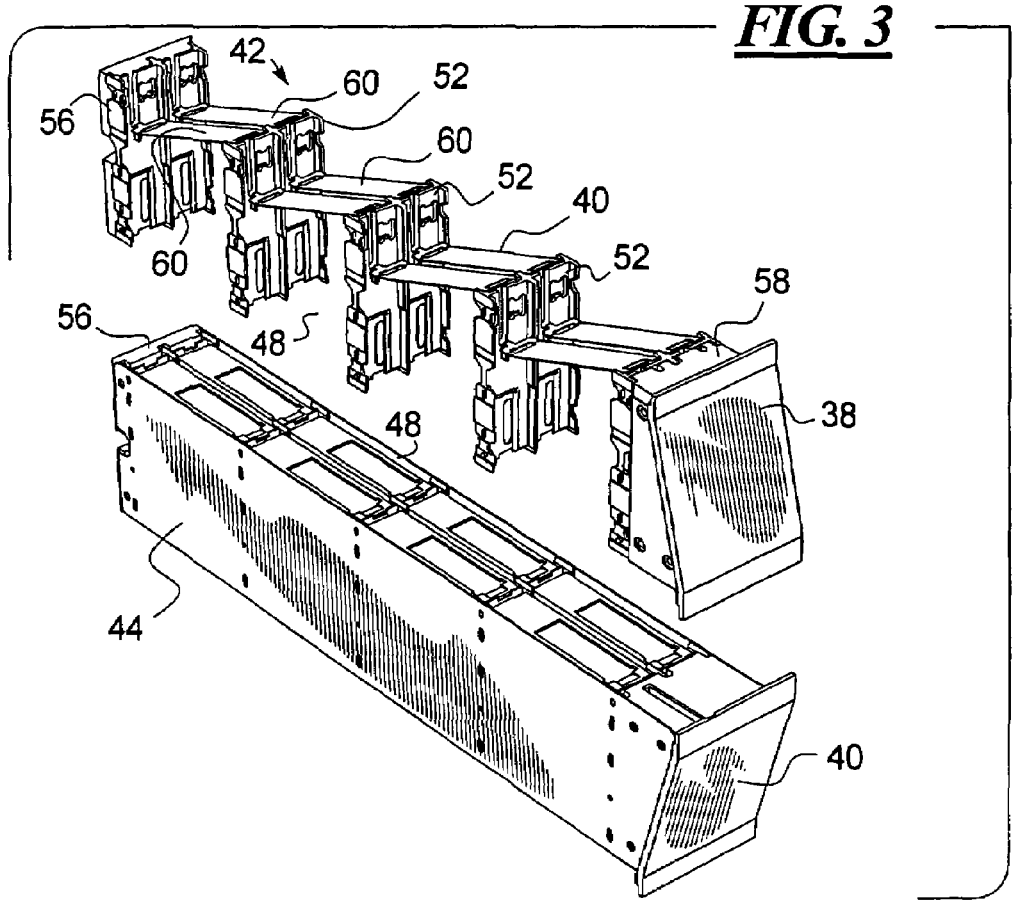
FIG. 3 is a perspective view of the cartridge storage magazines of FIG. 2 with the magazine housing removed from the upper storage magazine.

FIG. 3 shows the two storage magazines 42 and 44. The magazine 42 has had the cover or housing body 46 removed to reveal the partition walls 52 and the end cap 56 and wedge 58. Each of the slots 48 has an eject leaf spring 60. The leaf springs 60 are angled in their relaxed positions as shown to push cartridges from the slots 48. The angled ends of the leaf springs 60 are shown in a position after cartridge latches have been released, and the cartridges 50 have been ejected to a position where a cartridge picker mechanism (not shown but which are presented in detail in co-pending applications by the same assignee) can pull out the cartridge 50 from the magazine 42 or 44.

FIG. 4 shows the angled position of the leaf springs 60 in the slots 48 of the magazine 42. The springs 60 are connected at an attached end 62 to the partition walls 52 and a free end 64 is capable of movement between an eject position as shown and a cartridge latched position.

In FIG. 5, the storage slots 48 are arranged at regular intervals to facilitate robotic access to the cartridges 50 stored therein. The wedge 58 is shown as a solid, but as mentioned above may include an air filter or other feature. It is noted with reference to FIG. 5 as well as to FIGS. 3 and 4, that no longitudinal partition wall is provided between the storage slots 48. The cartridges 50 are maintained in their relative vertical positions by engaging the partition walls 52 at the lateral edges of the cartridge.

A pair of guide posts 65 are provided on the front cover 40 to position the storage magazine 44 in its fully inserted position in the data storage and retrieval device 20.

Figure 6:
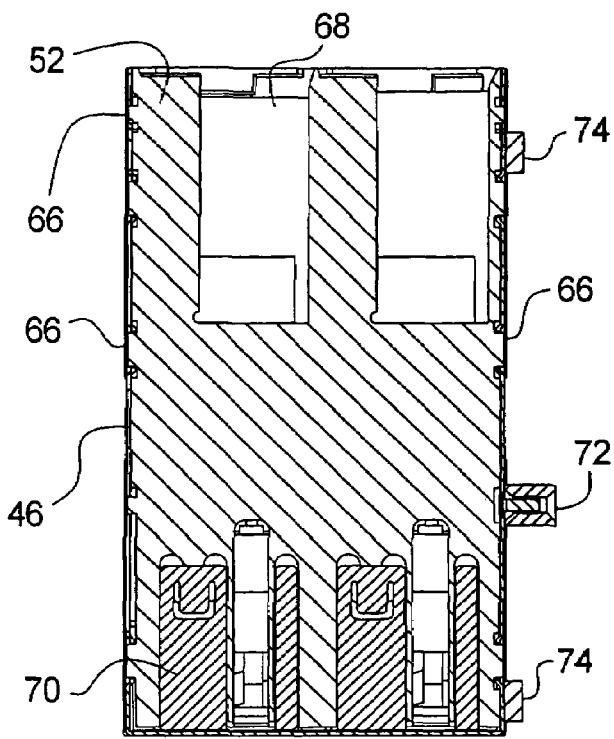
FIG. 6 is a transverse cross sectional view of the storage magazine of FIG. 4 along line C-C.

FIG. 6 shows one of the partition walls 52 in section parallel to its major plane. The partition wall 52 has small posts 66 that extend through holes in the housing body or cover 46 to form the connections 54. These connections hold the partition walls 52 in place. The partition walls 52 of the preferred embodiment are formed of plastic material, and parts of the posts 66 that are on the outside of the cover 46 are melted in order to keep all the partition walls in place. The partition wall 52 has openings for holding the fixed end 62 of the leaf spring 60 and includes components of the cartridge latch 70, which will be described in greater detail hereinafter.

A low friction guiding rail 72 is mounted to the magazine 44 for guided movement of the magazine into and out of the data storage and retrieval device 20. A pair of low friction sliding rails 74 are also mounted to the magazine 44.

Figure 7:
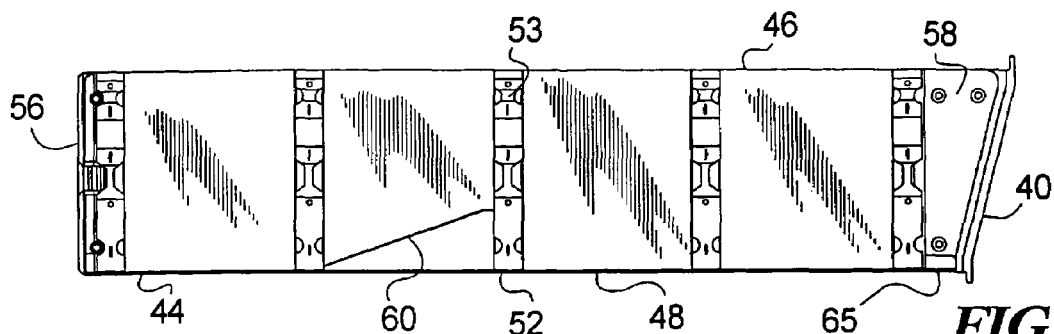
FIG. 7 is a side cross sectional view of the storage magazine.

FIG. 7 provides a side view inside the storage magazine 44. In this view, the leaf spring 60 of one of the storage slots (the second from the left) is shown in the eject position, while the other leaf springs 60 are in their latch position, which is the position the spring assumes when a cartridge is in the slot and latched in the fully inserted position. The end cap 56 and wedge 58 are at either end of the storage magazine 44. The partition walls 52 extend slightly farther than the housing body 46 at the open ends of the slots 48.

Figure 8:
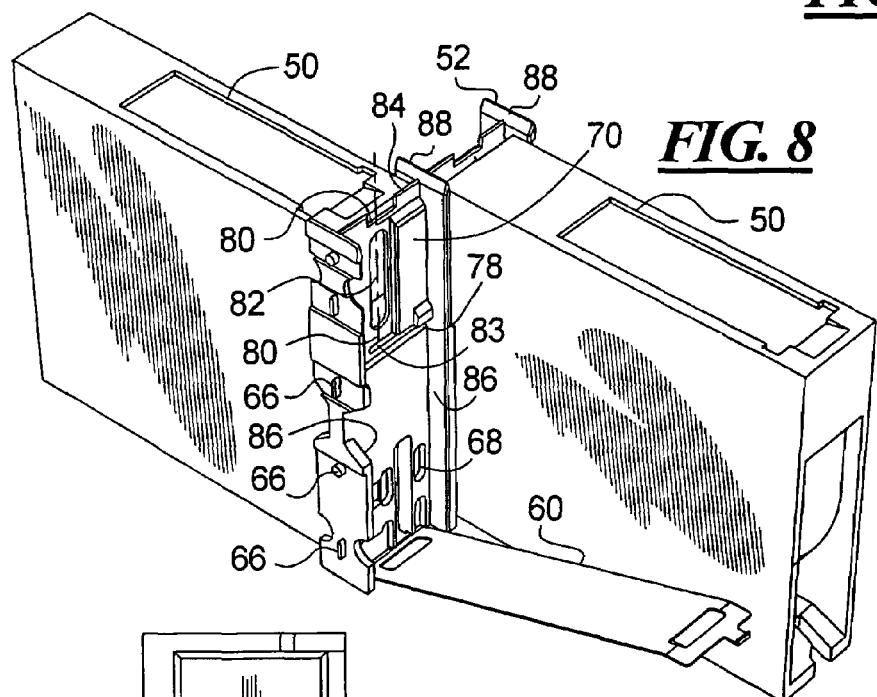
FIG. 8 is an enlarged perspective fragmentary view of the storage magazine showing a cartridge latch.

In FIG. 8, the partition wall 52 is shown in detail, including the posts 66 that extend through openings in the housing body 46 and are welded there. The partition wall 52 has the openings 68 to hold the leaf spring 60 at its fixed end 62. The latch 70 is a flexible arm that is fixed to the partition wall 52 and can flex relative thereto. One end has a projection 78 that engages into a notch opening in the side of the cartridge 50 when the cartridge is inserted into the slot and reaches its fully inserted position. The projection 78 acts to hold the cartridge in place.

The latch 70 is held to the partition wall by thin flex portions 80 that define an axis of rotation about which the flexible arm of the latch 70 pivots. The axis of rotation of the flexible arm 70 is parallel to the insertion direction of the cartridges 50 into the slot 48. An opening 82 reduces the length of the flexible portions and defines the axis of rotation of the pivoting motion. A slot 83 separates the back end of the latch arm 70 from the partition wall 52 to permit flexing about the axis of rotation. A forward extension 84 extending from the front end of the flexible latch arm 70 is engaged and moved by the robotic cartridge shuttle to selectively release the projection 78 from the opening in the cartridge 50 so that the leaf spring 60 may push the cartridge 50 to an eject position in the slot 48. It is also possible to release the cartridge manually by pushing the forward extension 84 with a finger. The user of the present device may thereby remove the cartridges 50 from the magazine 42 or 44 by manually releasing the latches 70.

The partition walls 52, as can be seen in FIG. 8, include cartridge edge engaging portions 86 that contact the top and bottom surfaces of the cartridges 50 adjacent the edges. The cartridges 50 are thereby held in their vertical positions by these portions 86, so that the need for a shelf in the magazine 42 or 44 between vertically disposed slots 48 is eliminated. This reduces the number of parts required, holds the cartridges 50 in defined positions for access by the robotic shuttle and provides low friction sliding surfaces during movement of the cartridges 50 into and out of the slots 48.

The front ends of the partition walls 52 are shaped with tapers 88 that guide the cartridges 50 into the slots 48 during insertion. The tapers 88 are on at least the horizontal portions of the partition wall front end, and may be provided on the vertical portions thereof as well. The tapers 88 avoid having a flat front surface that could impede insertion of the cartridge 50 if there where a small misalignment of the cartridge during the insertion motion.

Figure 9:
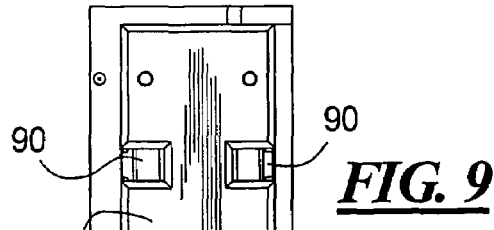
FIG. 9 is a transverse cross sectional view of the storage magazine.

FIG. 9 provides an end view of the end cap 56 for the storage magazine 44. The end cap 56 includes latch openings 90, as will be discussed hereinafter.

Figure 10:
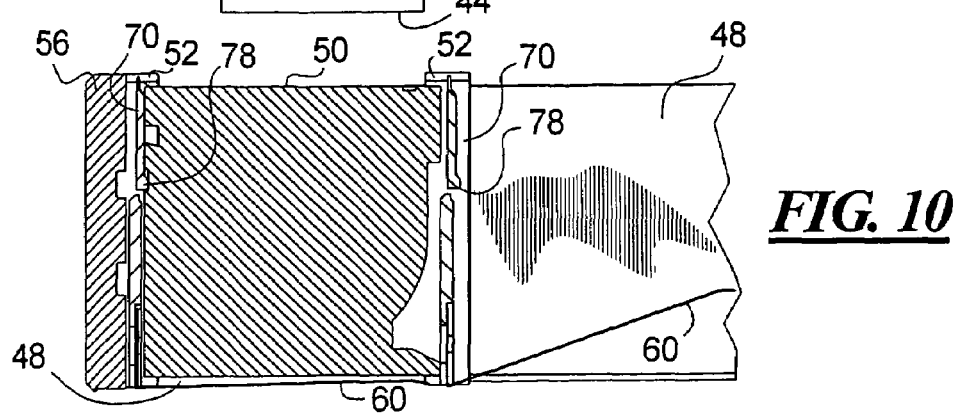
FIG. 10 is a cross sectional view of the storage magazine along line D-D of FIG. 9.

In FIG. 10, the storage slot 48 nearest the end cap 56 is provided with a cartridge 50. The leaf spring 60 is pressed against the back wall of the slot 48 by the cartridge and so is moved to its flexed position. In this fully inserted position, the projection 78 fits into a notch opening in the side of the cartridge 50. This secures the cartridge 50 in position until the forward extension 84 is moved to release the projection 78 and permit the spring 60 to slide the cartridge 50 forward.

In the second slot 48 from the end cap 56, no cartridge is present so that the leaf spring 60 is in the non-flexed position and the projection 78 of the latch 70 is not in contact with a tape cartridge. The projection 78 can be seen extending into the slot 48 somewhat so that it will contact and slide along a side of the cartridge during insertion and move into the notch opening in the cartridge upon full insertion.

Figure 11:
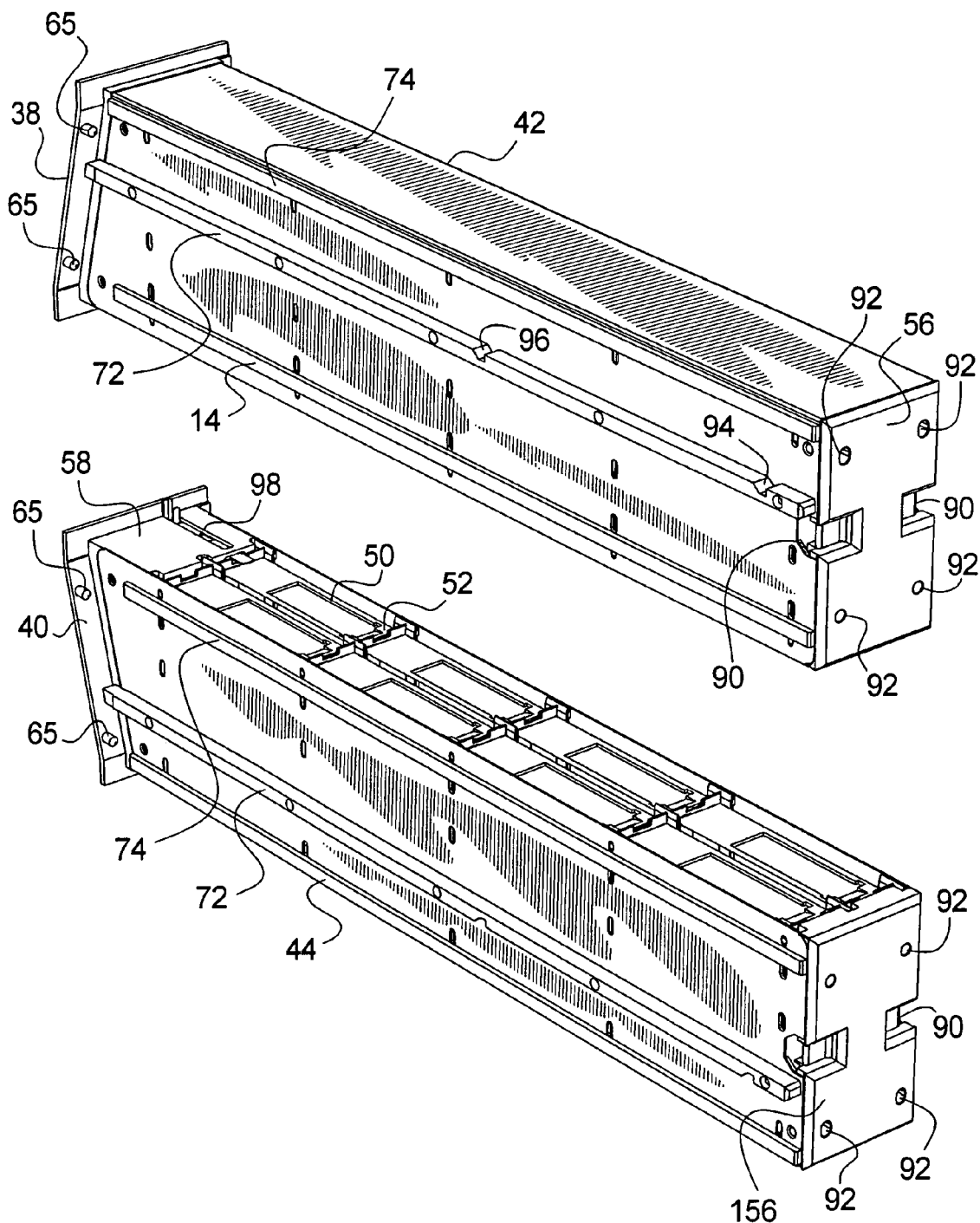
FIG. 11 is a perspective view from the end opposite that of FIG. 2 of the two storage magazines.

Turning now to FIG. 11, the storage magazines 42 and 44 have the guide posts 65 that are used to exactly position the magazines in the data storage and retrieval device 20. Also provided for precise positioning of the magazines 42 and 44 are positioning holes 92 for the final positioning of the rear end 56 of the magazines 42 and 44 when they are fully inserted. Posts inside the data storage and retrieval device 20 fit into the positioning holes 92 when the magazine is fully inserted. In a preferred embodiment, only two of the positioning holes 92 are used at a time, for example, the two positioning holes adjacent the side with the guide rail 72.

The openings 90 in the end cap 56 are provided for accepting a hook of a magazine lock, which engages in an undercut in the openings 90.

The guiding rail 72 is provided along one side of each of the magazines 42 and 44. Two notches 94 and 96 are provided at locations along the length of the guide rail 72. A latch as will be described in further detail hereinafter engages into the notches 94 and 96.

A slot 98 is provided in the wedge 58 for a slide bracket as will be discussed hereinafter for preventing removal of the cartridge when the magazine is in the mail-slot position.

FIG. 12 discloses an eject rail 100 that is mounted inside the data storage and retrieval device 20 and that engages the storage magazines 42 or 44 when the magazines are inserted into the device 20. The eject rail 100 is spring loaded and is provided on the side of the storage magazine 42 or 44 that has the guide rail 72 and sliding rails 74.

A closer view of the eject rail 100 is provided in FIG. 13, wherein a latch arm 102 is provided to engage into the notch 96 in the guiding rail 72. Engagement into the notch 96 is provided when the storage magazine 42 is moved into the so-called mail slot position. In the mail slot position, the magazine is partially ejected from the data storage and retrieval device 20 so that some of the storage slots 48 in the magazine are accessible to a user. Data cartridges 50 can thereby be exchanged from these accessible slots 48 without complete removal of the magazine 42 or 44 from the data storage and retrieval device 20. This permits the data cartridges to be inserted and removed readily by a user.

The latch arm 102 has a latch hook 104 that can catch the notches 96 and 94 during ejection of the magazine 42. The latch hook 104 will catch the notch 96 when the magazine 42 is released and pulled out by the eject rail 100 to the mail-slot position. The eject rail 100 is spring loaded. Then notch 96 stops the magazine movement in a controlled position where it is easy to remove.

In FIG. 13, the eject rail 100 is shown. It is spring loaded by two coil springs 106 and can slide in a longitudinal direction a distance equivalent to the maximum eject distance of the magazine 42. A cogwheel 108 is connected to a damper mechanism 110 as will be shown in further detail in FIGS. 15 and 16 and to a mating rack 112 on the eject rail 100. The operation of the rack 112, cogwheel 108 and damper 110 slows down the speed of the magazine 42 to a controlled movement during ejection of the magazine 42.

In FIG. 13, the magazine latch arm 100 is pivotable about a center 114 to permit the latch hook 104 one end thereof to disengage from the notches 94 and 96 in the rail 72. At the other end of the latch arm 100 is provided an eccentric cam 116 operable by a motor 118 to press against the latch arm 110 so as to cause the latch arm 100 to pivot. The latch arm 100 is spring loaded to bear against the cam 116 to ensure that an angular rotation of the latch arm 100 occurs that releases the hook 104 from the notch 94 or 96.

In FIG. 13, the hook 104 is in a lock position and when the magazine is fully inserted the hook 104 will catch the notch 96 in the guide rail 72 when the magazine is guided onto its guide pins, and it is locked in place for robotic cartridge removal/insertion in the magazine slots. If the magazine is moved to the mail slot position, the cam motor 118 is activated and thereby the eccentric cam 116 is rotated to a position that brings the hook 104 out of engagement (to the eject position) from the notch 96. Immediately after the magazine movement has started, the eccentric cam 116 is rotated back to the lock position again. The magazine will now be softly ejected until the hook 104 engages in the notch 94 (see FIG. 3) and stops in the mail slot position. After this operation, the magazine can be pushed back to the lock position or it can be removed if the eccentric part is rotated to the eject position.

In FIG. 14, a magazine lock 122 is provided to engage the end cap 56 of the magazine 42 at the latch openings 90, which are undercut to provide a locking surface. The magazine lock 122 includes a lock arm 124 that pivots about a pivot center 126 and is spring loaded to a stop position as illustrated in phantom and labeled "23 rotated". The lock 124 has a hook extension 128 that engages the undercut at the latch openings 90 to hold the magazine 42 securely to the eject rail 100.

When it is desired to remove the magazine 42 from the eject rail, the lock arm 124 is pivoted to an unlock position. This removes the hook extension 128 from the undercut and permits the spring loaded eject rail 100 to be removed from the magazine 42.

The spring loaded eject rail 100 pushes the magazine out of the device 20 when the hook on the arm 102 is disengaged. The movement of the magazine 42 is damped by the damping device 110 to cause the magazine 42 to slide softly to a position where it can be removed from the loader 20. The eject motion of the magazine is the result of the magazine 42 being engaged with the eject rail 100.

Figure 15:
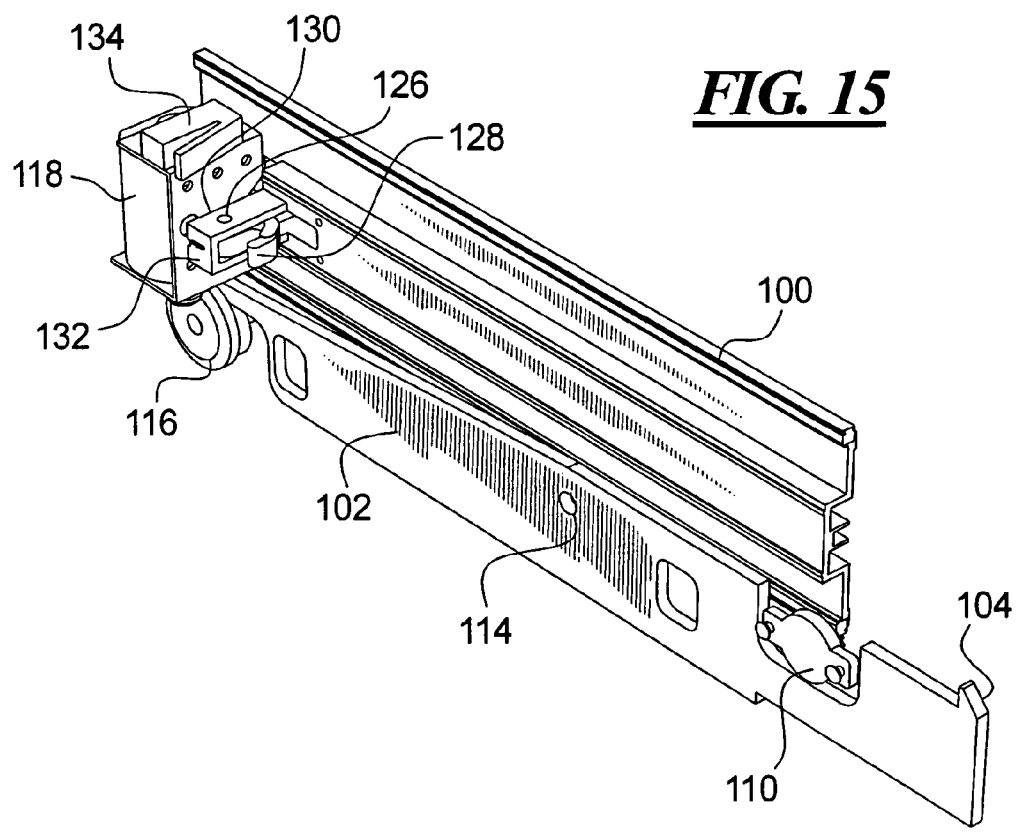
FIG. 15 is a perspective view of the locking and eject mechanism with an eject rail, motor, gear and magazine latch arm.

Turning to FIG. 15, the eject rail 100 for the lower magazine 44 is shown separated from the lower magazine. The damping device 110 that slows the eject motion of the magazine ejection is shown. Also shown is the latch arm 102 that pivots about the pivot location 114 to move the hook 104 into notches on the rail on the magazine 44. The cam 116 and cam motor 118 are shown more clearly, the cam motor 118 being mounted in a motor bracket 130. The hook 128 that holds the eject rail 100 to the magazine 44 is also seen adjacent the motor bracket 130. The hook 128 is pivotable about the pivot center 126 in the hook bracket 132. A hook release 134 is provided for releasing the hook 128 from the magazine 44.

Figure 16:
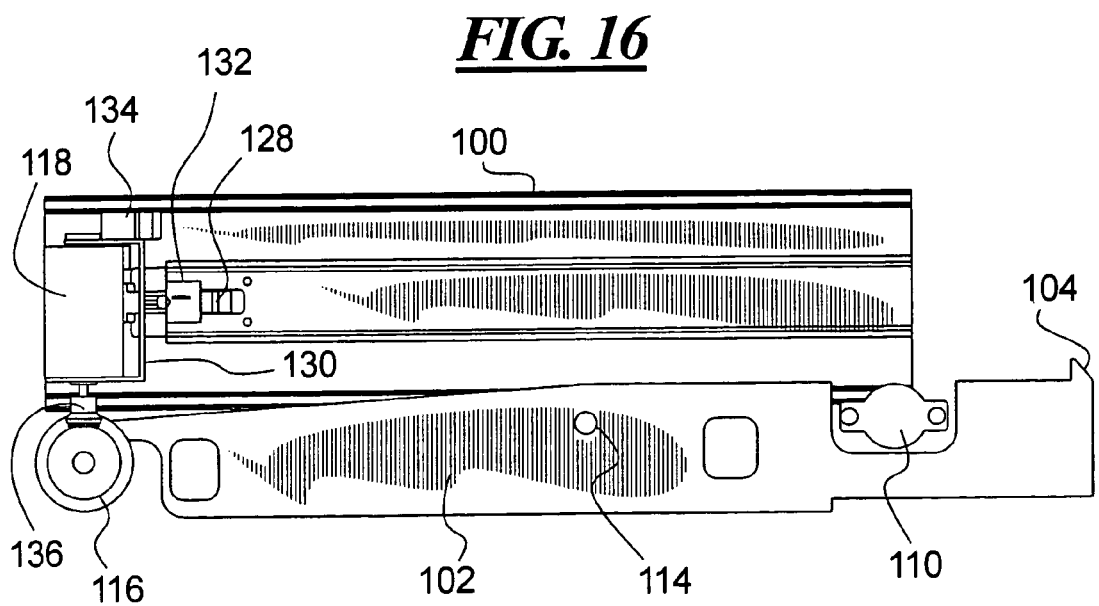
FIG. 16 is a side elevational view of the locking and eject mechanism of FIG. 15.

In FIG. 16, the cam 116 is connected to the cam motor 118 by a bevel gear. In particular, the operation of the cam motor 118 rotates the bevel gear 136 that in turn rotates the cam 116, which through an eccentric cam surface causes pivoting of the latch arm 102. The cam motor 118 thereby controls locking of the magazine in place in the device.

During the magazine eject movement, the hook 128 is in engagement with the undercut 90 on the magazine rear cover 56. In this position, the magazine 44 is coupled to the eject rail 100 and if a user tries to pull out the magazine, the damping mechanism 110 will slow down the speed. At the end of the eject rail eject movement, a stop pin 140 (see FIG. 14) attached to the loader chassis will hit the arm 122 and the arm will rotate to a position where the hook 128 is removed from the undercut 90.

The cartridges 50 are removable from the storage magazines 42 and 44 when the magazines are removed from the device 20. When the magazines are partially ejected from the device 20, only the first column of cartridges (or possible the first few columns) are accessible to the user for removal and re-insertion of the cartridges 50. It is desirable that an exchange of a single (or limited number) of data cartridges by the user take place at a known location. As such, the present storage magazines 42 and 44 restrict removal of the data cartridges from all but one storage slot 48 in the preferred embodiment. This is accomplished by the apparatus as shown in FIG. 5, wherein a slide bracket 142 for preventing extraction of one of the cartridges 50 is shown. A coil spring (not shown) pushes the slide bracket 142 to a hard stop position where a blocking tab 144 will prevent the cartridge 50 in the corresponding slot 48 from being extracted. A label is also provided on the magazine to inform the user that this cartridge is unavailable for immediate exchange and that the other cartridge is the mail-slot cartridge, or immediate exchange cartridge, when the magazine 44 or 42 is partially extending from the device 20.

When the magazine 44 or 42 is fully inserted into the device 20, the protruding part 142 of the slide bracket hits a hard stop in the device 20 and slides to a position where the cartridge that is blocked by the tab 144 can be changed by the robotics, for example, by the cartridge shuttle. It is also possible to remove the cartridge 50 manually by pulling the protruding part 142 to the position mentioned above in order to change cartridges.

Now that the storage magazines 42 and 44 have been described in some detail, consider again the placement of the magazines 42 and 44 in the device 20. In FIG. 18, the data storage and retrieval device 20 has a chassis 150 on which a housing as shown in FIG. 1 is mounted. The chassis 150 supports a tape drive 152 mounted in tape drive brackets 154. The tape drive 152 may be a single tape drive or a multiple tape drive. The tape drive 152 accepts the cartridges 50 stored in the magazines 42 and 44. The storage magazine 42 is shown in place with its front cover 38, whereas the storage magazine 44 has been removed to reveal guides 156. A space 158 between the storage magazines 42 and 44 contains a cartridge shuttle apparatus, such as is shown in U.S. Provisional application 60/515,738 filed Oct. 30, 2003, and the non-provisional application claiming the benefit thereof, the disclosure of which is incorporated herein by reference.

Spaces 158 adjacent the tape drive 152 accommodate circuit boards for the control circuitry and a motor 160 for movement of the cartridge shuttle (not shown).

The end of the space for accepting the storage magazines includes the eject rail 100 and hook 128 for securing the magazine.

As mentioned above, the components for guiding the storage magazines are symmetrical and are provided for both magazine spaces.

In the detail view of FIG. 19, guide pins 162 are shown. The guide pins 162 fit into the holes 92 on the end caps 56 of the storage magazines 42 and 44 when the magazines are fully inserted into the device 20. Also seen in detail in this view if the hook 128 in the hook housing 132. The hook 128 is on an arm 122 that pivots about the pivot point 126. The detail of FIG. 19 shows the eject bracket 100.

The present device is scalable to different sizes and form factors. In one example, a rack-mount device is provided having a 2U standard size form factor height. It is also important that the form factor height can start at 1 U and be scalable up to e.g. 4U. According to the invention, the cartridges are placed horizontally in the cartridge magazine 42 and 44 and the cartridge magazine is also horizontal when it is loaded into the device 20 drives housing.

The complete device 20 is here called a "loader". The illustrated embodiments are based on a rack mount device, but this invention also relates to table-top or shelf mounted devices as well.

Two magazines 42 and 44 for the data cartridges are fully insertable into the loader 20. The cartridges 50 are positioned horizontally in both magazines with the cartridge access openings facing toward each other. During insertion of the magazines in the loader, coil springs 106 (which have a low cost and thus help to achieve a low cost apparatus) are tensioned, and finally when the magazine is fully inserted a motor activated locking mechanism locks the magazine in place. One or more tape drives are located close to the rear end of the loader. A traverse, rotator, picker and elevator mechanism (also referred to as a cartridge shuttle) is provided to pull out one cartridge at a time from the magazine and load it into the drive or pull the cartridge out from the drive, transport it to the magazine and insert it into a slot in the magazine until the cartridge lock mechanism in the magazine is activated.

When the magazine lock motor is turned to an unlock position, the magazine is ejected by the tensioned coil springs 106 in a damped movement. The lock motor is immediately turned into a lock position again and the magazine is pulled out by the coil springs until a latch prevents further movement. Now the magazine is protruding a distance from the front of the loader device that is sufficient to remove a cartridge. This is referred to as a mail-slot position. In this example, the second cartridge which is visible to the user, is prohibited from being removed by a simple inhibit mechanism 142. If the magazine lock is turned to the unlock position again, the magazine is further ejected by the coil springs to a stop position where the magazine can be easily removed from the loader. If the magazine lock motor is turned to the unlock position when the magazine is completely inserted and in a locked position and the lock motor is not turned back to the lock position, the magazine will slide softly to a position where it can be removed from the loader. The magazines are prevented from wrong insertion, in other words, are prevented from being inserted in a wrong orientation.

During these operations, the cartridges 50 which are located in the magazine which is still locked in place can be manipulated to and from the drive as mentioned above. The magazines of embodiments of the invention are specially made for different types of cartridges, as needed. In this case, the magazine includes a feature for detection of which type of cartridge is inserted in the loader, and the firmware is adjusted accordingly.

The only inventory update needed for the loader after start up is through the use of the mail slot function that is accomplished by the partially removable storage magazines.

Both the cartridges and the magazines are made in such a way that wrong insertion is impossible. The magazines are constructed to provide the latch for the cartridges at the side walls, with a side wall activated unlocking operation as well. The magazine are of an economical construction, including a sheet metal housing wrapped around the partition walls and the end pieces. The front cover of the magazine may snap into place for simple exchange with other covers. The covers may be marked or color coded for easy identification by a user. The front covers may provide an air filter to keep dust from inside the device. The air filters may be readily changed by partially ejecting the magazines as described above.

As a further economical feature, all parts except for the front covers are identical and can be interchanged with one another, which also cuts down on manufacturing costs. Measures are provided to prevent inadvertent insertion of the magazines in the wrong orientation or wrong space, such fool proof measures including various pins and slides shaped to permit insertion in only the proper orientation. Guide pins provided according to the present invention provide positive fine positioning for accurate relative positioning of the magazine and thereby proper operation of the robotic cartridge shuttle.

The cartridge lock/unlock in magazine slots includes an eject spring for the cartridges and prevent the insertion of the cartridges in the wrong orientation. The rotation axis for the cartridge lock latches are parallel to the cartridge insert direction.

The soft eject of the magazines provided by the present invention provides that the eject rail is pulled by coil springs including a damping mechanism for a soft load/eject of magazines. The hook on the eject rail couples the magazine to the eject rail during the eject movement of the magazine. Unwanted fast movement of the magazine created by the operator is prevented. The damped movement is provided without the need for a motor, and thereby at low cost.

The present invention provides a mail slot operation without requiring the presence of a physical mail slot in the device. The cartridge mail-slot operation is an integrated a part of the magazine and one ore more predefined slots in the magazine can be used as a mail slot in a device of a 2U and higher form factor. Both magazines can be used either together at the same time or one at the time in the mail slot operation. The mail slot operation is provided by the guide rail under magazine which is designed to lock in two positions. The two positions are completely inserted and locked, or in mail-slot position (which is a partially ejected position).

Preferably, firmware controls the motor for lock/unlock and mail-slot position of magazine. The movement of one of the storage magazines to the mail slot position does not block the cartridge shuttle from manipulating and operate with the cartridges in the magazine which is still locked in place, so operation of the present device can continue even when the other magazine is in mail-slot position. It is also possible to change one magazine when the other magazine is in use by the robotics.

As mentioned above, the mail-slot is marked with a label and one or more slots are blocked by a slide arm to prevent their use in the mail slot position. As such, here is no need for other update of cartridge inventory than for the cartridge in the mail-slot after an exchange.

Thus, there is shown and described a data storage and retrieval device utilizing a data cartridge recording and playback apparatus and having storage magazines for holding a plurality of data cartridges for use by the recording and playback apparatus. The storage magazines have slots for storing the data cartridges and retaining the data cartridges in place when not being accessed using a cartridge latch. A spring moves the cartridge to an eject position upon release of the cartridge latch. Similarly, the storage magazines have a latch to secure the magazine in place and to selectively release the magazine when desired. The spring loaded ejection apparatus for the magazines is damped to provide slowed movement during the ejection of the magazine. Further, a catch secures the magazine in a partially ejected position to permit exchange of one or a limited number of the cartridges without complete removal of the magazine from the device, and preferably without halting the operation of the device.

Although other modifications and changes may be suggested by those skilled in the art, it is the intention of the inventors to embody within the patent warranted hereon all changes and modifications as reasonably and properly come within the scope of their contribution to the art.

I claim:

1. A data storage and retrieval device, comprising:
a housing;
a data cartridge drive for recording and reading data from a data cartridge;

at least one storage magazine in said housing, said storage magazine defining a plurality of storage slots adapted to receive data cartridges;

a cartridge shuttle for transfer of data cartridges between said data cartridge drive and said storage magazine;

a magazine latch securing said storage magazine in said housing in a hilly inserted position such that said cartridge shuffle can access data cartridges in said storage magazine; and a soft eject apparatus connected to said storage magazine and including a spring and a damper connected to slow movement of the storage magazine during movement at least from said fully inserted position to an eject position.

2. A data storage and retrieval device as claimed in claim 1, wherein said soft eject apparatus includes:

an eject rail connected to a said storage magazine, a rack on said eject rail, a cog wheel engaging said rack, and a damper device connected to said cog wheel.

3. A data storage and retrieval device as claimed in claim 1, wherein said soft eject apparatus is selectively releasable from said storage magazine.

4. A data storage and retrieval device as claimed in claim 1, wherein said magazine latch includes first and second latching positions to selectively latch said magazine in either said fully inserted position or a partially ejected position.

5. A data storage and retrieval device as claimed in claim 1, wherein said storage magazine include partition walls separating one of said plurality of storage slots from one another, said partition walls including cartridge latches selectively securing said cartridges in said storage slots.

6. A data storage and retrieval device as claimed in claim 5, wherein said cartridge latches include pivotable latch members constructed to pivot about a pivot axis substantially parallel to an insertion direction of said data cartridges into said storage slots.

7. A data storage and retrieval device as claimed in claim 6, wherein said partition walls are formed in one piece with said latch member.

8. A data storage and retrieval device as claimed in claim 7, wherein said storage magazine includes a sheet metal housing fastened on said partition walls.

9. A data storage and retrieval device as claimed in claim 5, wherein said cartridge latches include release portions extending from adjacent openings of said storage slots.

10. A data storage and retrieval device as claimed in claim 5, further comprising:

cartridge eject springs in each of said storage slots.

11. A data storage and retrieval device as claimed in claim 1, further comprising:

an end cap on said storage magazine, said end cap including connecting portions for connecting to said soft eject apparatus.

12. A data storage and retrieval device as claimed in claim 1, wherein said magazine latch includes first and second latching positions to selectively latch said magazine in either said fully inserted position or a partially ejected position, and further comprising:

a cartridge securing tab formed in said storage magazine to restrict removal of said data cartridges from at least one of said storage slots while leaving at least another of said storage slots free from restriction while said storage magazine is in said partially ejected position.

13. A data storage and retrieval device as claimed in claim 1, wherein said magazine latch includes:

a latch arm having a hook portion at a first end and a second end, a pivot fastened to said latch arm between said first and second ends, a cam in contact with said second end of said latch arm, and a motor connected to operate said cam.

14. A data storage and retrieval device as claimed in claim 13, further comprising:

an eject rail on said storage magazine, said eject rail having first and second notches for engagement by said hook portion of said latch arm.

15. A data storage and retrieval device as claimed in claim 14, further comprising:

an air filter in said storage magazine behind said removable front cover.

16. A data storage and retrieval device as claimed in claim 1, wherein said storage magazine includes a removable front cover.

17. A data storage and retrieval device as claimed in claim 1, further comprising:

alignment pins extending between said housing and said storage magazine when said storage magazine is in a fully inserted position in said housing.

18. A data storage and retrieval device, comprising:

a housing;

a data cartridge drive for recording and reading data from a data cartridge;

at least one storage magazine in said housing, said storage magazine defining a plurality of storage slots adapted to receive data cartridges;

a spring loaded ejection rail connected to said at least one storage magazine to move said at least one storage magazine between a fully inserted position and a second position that is partially ejected from said housing, said spring loaded ejection rail biasing said at least one storage magazine from said fully inserted position to said second position;

a cartridge shuttle for transfer of data cartridges between said data cartridge drive and said storage magazine; and a magazine latch having a first securing position securing said storage magazine in said housing in a fully inserted position such that said cartridge shuffle can access data cartridges in said storage magazine, said magazine latch including a second securing position with said storage magazine partially ejected from said housing, said magazine latch being movable from said first securing position so that said spring loaded ejection rail moves said at least one storage magazine from said fully inserted position toward said second position.

19. A data storage and retrieval device as claimed in claim 18, wherein said at least one storage magazine includes first and second storage magazines, said cartridge shuttle being operable to access cartridges in said first storage magazine while said second storage magazine is in said fully inserted position and while said second storage magazine is in said partially ejected position.

20. A data storage and retrieval device, comprising:

a housing;

a data cartridge drive for recording and reading data from a data cartridge;

at least one storage magazine in said housing, said storage magazine defining a plurality of storage slots adapted to receive data cartridges;

a cartridge shuffle for transfer of data cartridges between said data cartridge drive and said storage magazine; and a magazine latch securing said storage magazine in said housing in a fully inserted position such that said cartridge shuffle can access data cartridges in said storage magazine, said magazine latch including a second securing position with said storage magazine partially ejected from said housing said magazine latch including:
- a latch arm having a hook portion at a first end and a second end,
- a pivot fastened to said latch arm between said first and second ends,
- a cam in contact with said second end of said latch arm, and
- a motor connected to operate said cam.

21. A method for operating a data storage and retrieval device, comprising the steps of:
- storing a plurality of data cartridges in a storage magazine in a data storage and retrieval device;
- partially ejecting the storage magazine from the data storage and retrieval device;
- damping ejecting movement of the storage magazine during said ejecting step;
- at least one of:
  - removing at least one data cartridge from the storage magazine while said storage magazine is partially ejected from the data storage and retrieval device; and
  - inserting at least one data cartridge into the storage magazine while said storage magazine is partially ejected from the data storage and retrieval device;
  - moving the storage magazine to a fully inserted position in said data storage and retrieval device; and
- said step of partially ejecting including softly ejecting the storage magazine to the partially ejected position.

22. A data storage and retrieval device, comprising:
- a housing;
- a data cartridge drive for recording and reading data from a data cartridge;
- at least one storage magazine in said housing, said storage magazine defining a plurality of storage slots adapted to receive data cartridges;
- a damping device connected to said at least one storage magazine to slow movement of said at least one storage magazine between a fully inserted position and a second position that is partially ejected from said housing;
- a cartridge shuffle for transfer of data cartridges between said data cartridge drive and said storage magazine; and
- a magazine latch having a first securing position securing said storage magazine in said housing in a fully inserted position such that said cartridge shuffle can access data cartridges in said storage magazine, said magazine latch including a second securing position with said storage magazine partially ejected from said housing.

23. A data storage and retrieval device, comprising:
- a housing;
- a data cartridge drive for recording and reading data from a data cartridge;
- at least one storage magazine in said housing, said storage magazine defining a plurality of storage slots adapted to receive data cartridges;
- an eject apparatus connected to said at least one storage magazine to provide an ejection force to eject said at least one storage magazine from a fully inserted position toward a second position that is partially ejected from said housing;
- a cartridge shuttle for transfer of data cartridges between said data cartridge drive and said storage magazine; and
- a magazine latch having a first securing position securing said storage magazine in said housing in a fully inserted position such that said cartridge shuffle can access data cartridges in said storage magazine, said magazine latch including a second securing position with said storage magazine partially ejected from said housing, said magazine latch being movable from said first securing position so that said eject apparatus moves said at least one storage magazine from said fully inserted position toward said second position.

* * * * *